(12) United States Patent
Ferreira, Jr.

(10) Patent No.: US 11,562,004 B2
(45) Date of Patent: Jan. 24, 2023

(54) CLASSIFYING AND FILTERING PLATFORM DATA VIA K-MEANS CLUSTERING

(71) Applicant: JPMorgan Chase Bank, N.A., New York, NY (US)

(72) Inventor: Wilson De Sousa Ferreira, Jr., New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 199 days.

(21) Appl. No.: 16/915,044

(22) Filed: Jun. 29, 2020

(65) Prior Publication Data

US 2021/0004391 A1    Jan. 7, 2021

Related U.S. Application Data

(60) Provisional application No. 62/869,666, filed on Jul. 2, 2019.

(51) Int. Cl.
*G06F 16/28*    (2019.01)
*G06F 16/245*    (2019.01)

(52) U.S. Cl.
CPC .......... *G06F 16/285* (2019.01); *G06F 16/245* (2019.01)

(58) Field of Classification Search
None
See application file for complete search history.

(56) References Cited

U.S. PATENT DOCUMENTS

2012/0259831 A1* 10/2012 Wang .................. G06F 16/9535
707/738
2017/0103343 A1* 4/2017 Yee ....................... G06F 16/248
2018/0032523 A1* 2/2018 Singhal ............ G06F 16/24578

FOREIGN PATENT DOCUMENTS

WO    WO-2020042164 A1 * 3/2020

* cited by examiner

*Primary Examiner* — Scott A. Waldron
(74) *Attorney, Agent, or Firm* — Greenblum & Bernstein, P.L.C.

(57) ABSTRACT

Systems and methods are provided for classifying and filtering data, including receiving a query via a platform, the platform including platform data; clustering the query to create a query cluster; identifying a domain of the query cluster; clustering the platform data to create platform data clusters; identifying a corresponding platform data cluster, the corresponding platform data cluster being one of the platform data clusters that is in a same domain as the domain of the query cluster; assigning a rank to one or more portions of the platform data within the corresponding platform data cluster; and routing at least one of the portions of the platform data having a rank greater than a threshold.

16 Claims, 6 Drawing Sheets

CLASSIFYING AND FILTERING PLATFORM DATA VIA K-MEANS CLUSTERING

CROSS-REFERENCE TO RELATED APPLICATIONS

This application claims the benefit of U.S. Provisional Patent Application Ser. No. 62/869,666, filed Jul. 2, 2019, which is hereby incorporated by reference in its entirety.

BACKGROUND

1. Field of the Disclosure

The present disclosure relates generally to methods and systems for classifying and filtering information in a collaborative platform based on natural language processing of the information. Specifically, aspects of the present disclosure relate to classifying and filtering information in a collaborative platform using machine learning algorithms.

2. Background Information

Online communication and exchange platforms are routinely utilized to exchange a wide range of information and data relative to a wide array of domains such as, e.g., financial transactions, area-specific discussions, scientific exchange, and the like, between a plurality of users of the platforms. In addition, collaboration platforms, such as, for example, chat servers or messaging servers, which allow users to share and discuss data and other information, can include large amounts of information provided by a number of users as they exchange information. Accordingly, when a user submits a question or request to the platform, it is typically difficult for the user to receive information relevant to that specific question or request because of the large volume of data available at the collaboration platform. Further, if the data is searched manually or through traditional keyword search, the results may not be of sufficient quality or relevance to be practically useful to the user. Searching and processing of such large volumes of messages and data available at the platform thus typically presents disadvantages in terms of the time and effort necessary to prioritize and exploit the available data. In addition, current communication systems typically do not assist users in identifying messages or materials that are relevant or otherwise related to a specific question or request.

Accordingly, current communication systems such as, for example, collaboration platforms, are typically inefficient and time consuming. As a result, the average user may spend a large amount of time reading and responding to emails and messages, and a large portion of that time may be spent sorting through messages that are unrelated to their work or to their specific need. Therefore, it may be advantageous to have an efficient information organization system to assist users in classifying and filtering the data available on a collaboration platform in order to identify and receive messages and data that are most relevant to specific questions or requests.

SUMMARY

The present disclosure, through one or more of its various aspects, embodiments, and/or specific features or sub-components, provides, inter alia, various systems, servers, devices, methods, media, programs, and platforms for providing data from a collaboration platform, The various aspects, embodiments, features, and/or sub-components provide data that is relevant to a particular question or query submitted by a user of the collaboration platform.

According to an aspect of the present disclosure, a method for classifying and filtering data is provided, The method is implemented by a processor on a computing device. The method includes: receiving, by the processor, a query via a platform, the platform including platform data; clustering, by the processor, the query to create a query cluster; identifying, by the processor, a domain of the query cluster; clustering, by the processor, the platform data to create at least one platform data cluster; identifying, by the processor, a corresponding platform data cluster, the corresponding platform data cluster being one from among the at least one platform data cluster that is in a same domain as the domain of the query cluster; assigning a rank, by the processor, to at least one portion of the platform data within the corresponding platform data cluster; and routing, by the processor, at least one from among the at least one portion of the platform data for which the assigned rank is greater than a predetermined threshold.

The assigning of the rank may be performed based on at least one from among a relevance of the at least one portion of the platform data to the query, a number of times the at least one portion of the platform data is shared between users, and a number of times the at least one portion of the platform data has been viewed by the users.

The routing may include transmitting the at least one portion of the platform data to an initiator of the query.

The query may include at least one from among a message, a question, and a search request. The message may include at least one from among an e-mail message, a voicemail message, and a chat message.

At least one from among the clustering the query and the clustering the platform data may include using a machine learning algorithm. The using of the machine learning algorithm may include using a k-means clustering algorithm.

The platform may include a data server that is configured to facilitate access to at least one from among a plurality of messages and a plurality of documents.

The platform may include at least one from among a collaboration platform, a chat platform and a messaging platform.

The method may further include repeating each of the receiving of the query, the clustering of the query, the identifying of the domain, the clustering of the platform data, the identifying of the corresponding platform data cluster, the assigning of the rank, and the routing at a user-selectable periodic interval.

According to another exemplary embodiment, a computing apparatus for classifying and filtering data is provided. The computing apparatus includes a processor; a memory; and a communication interface coupled to each of the processor and the memory. The processor is configured to: receive, via the communication interface, a query via a platform, the platform including platform data; cluster the query to create a query cluster; identify a domain of the query cluster; cluster the platform data to create at least one platform data cluster; identify a corresponding platform data cluster, the corresponding platform data cluster being one from among the at least one platform data cluster that is in a same domain as the domain of the query cluster; assign a rank to at least one portion of the platform data within the corresponding platform data cluster; and route at least one of the at least one portion of the platform data for which the assigned rank is greater than a predetermined threshold.

The processor may be further configured to assign the rank based on at least one from among a relevance of the at least one portion of the platform data to the query, a number of times the at least one portion of the platform data is shared between users, and a number of times the at least one portion of the platform data has been viewed by the users.

The processor may be further configured to perform the routing by transmitting, via the communication interface, the at least one portion of the platform data to an initiator of the query.

The query may include at least one from among a message, a question, and a search request. The message may include at least one from among an e-mail message, a voicemail message, and a chat message.

The processor may be further configured to use a machine learning algorithm for performing at least one from among the clustering of the query and the clustering of the platform data. The machine learning algorithm may be a k-means clustering algorithm.

The platform may include a data server that is configured to facilitate access to at least one from among a plurality of messages and a plurality of documents.

The platform may include at least one from among a collaboration platform, a chat platform and a messaging platform.

The processor may be further configured to repeat each of the receiving of the query, the clustering of the query, the identifying of the domain, the clustering of the platform data, the identifying of the corresponding platform data cluster, the assigning of the rank, and the routing at a user-selectable periodic interval.

BRIEF DESCRIPTION OF THE DRAWINGS

The present disclosure is further described in the detailed description which follows, in reference to the noted plurality of drawings, by way of non-limiting examples of example embodiments of the present disclosure, in which like characters represent like elements throughout the several views of the drawings.

DETAILED DESCRIPTION

Figure 1:
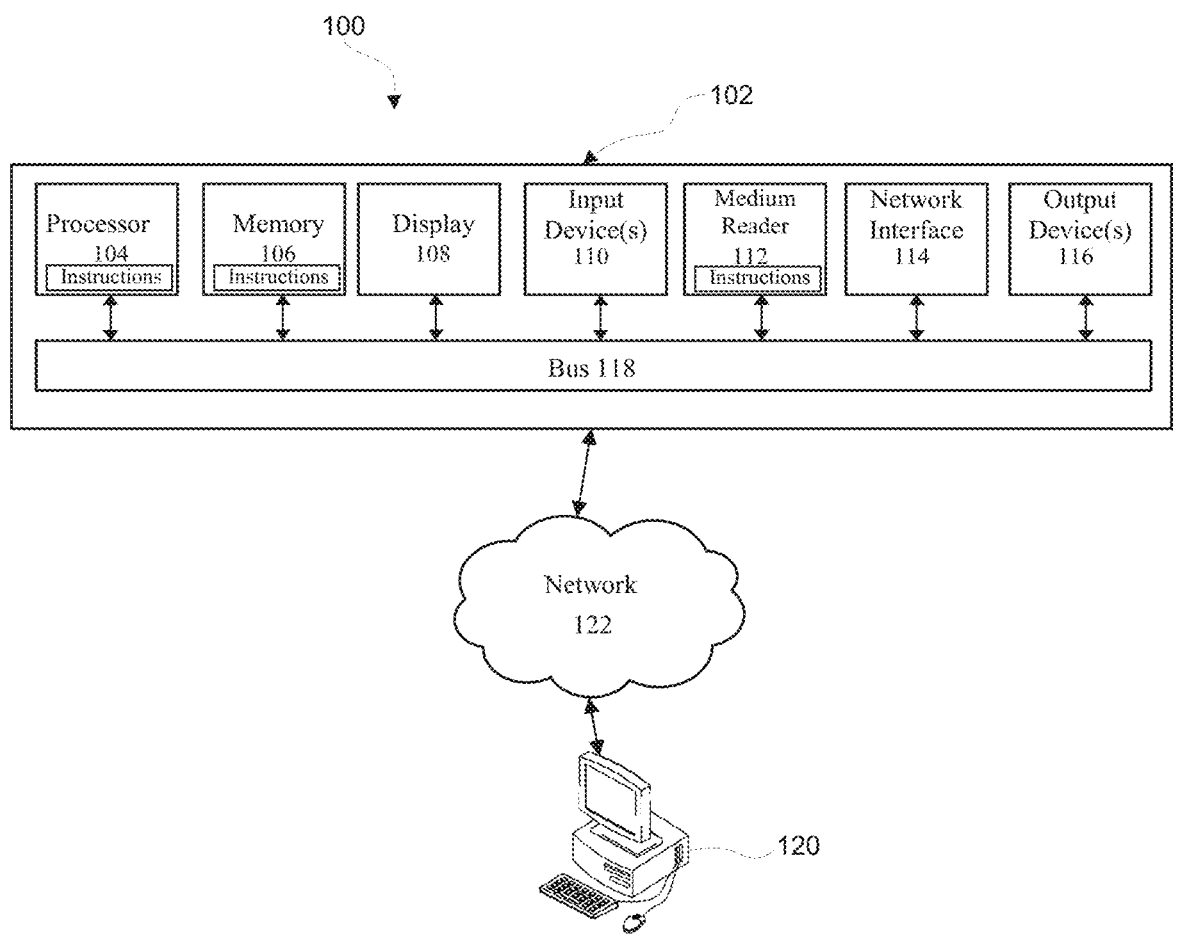
FIG. 1 illustrates a computer system for implementing the method for classifying and filtering data, according to an exemplary embodiment.

Through one or more of its various aspects, embodiments and/or specific features or sub-components of the present disclosure, are intended to bring out one or more of the advantages as specifically described above and noted below.

Embodiments of the invention improve the technology of data classification, indexing and filtering by relying on natural language processing of the data, and in particularly by using machine learning algorithms to reveal the structure and meaning of text included in the data. Embodiments of the invention employ an unconventional arrangement of steps including: receiving a query via a platform, the platform including platform data; clustering the query to create a query cluster by using a machine learning algorithm; identifying a domain of the query cluster; clustering the platform data to create one or more platform data clusters; identifying a corresponding platform data cluster, the corresponding platform data cluster being one of the platform data clusters that is in a same domain as the domain of the query cluster; assigning a rank to one or more portions of the platform data within the corresponding platform data cluster; and routing one or more of the portions of the platform data having a rank greater than a threshold. The combination of the steps is unconventional. For example, the step of identifying a corresponding platform data cluster, the corresponding platform data cluster being one of the platform data clusters that is in a same domain as the domain of the query cluster creates new info on that does not exist in the system, and this new information is then used in subsequent steps in an unconventional manner, namely to route portions of the platform data that have a rank greater than a threshold. Embodiments of the invention also utilize elements and/or techniques that are necessarily rooted in computer technology, including natural language processing analysis using machine learning algorithms. Exemplary embodiments improve the functioning of a computer combination, in this case a collaboration platform and a client device, and more specifically include aspects that are directed to a specific improvement of classifying and filtering information available at a collaboration platform when use in communication between users, and thus are directed to a specific implementation of a solution to a problem in classifying and filtering information available at a collaboration platform.

Content clustering methods can provide an advantage in classifying and filtering user entered data by using machine learning algorithms as part of the natural language processing of the user entered data. Amongst such machine learning algorithms is the "k-means" clustering algorithm. The content clustering method typically referred to as "k-means clustering" is a method of vector quantization, originally derived from signal processing, that is typically used for cluster analysis in data mining. Typically, when confronted to a number "n" of messages, k-means clustering partitions the "n" messages into "k" clusters, where a cluster may include one or more of the "n" messages. The term "cluster" typically refers to a collection of data points aggregated together because of certain similarities. More specifically, the k-mean algorithm identifies "k" number of centroids in the dataset, each centroid defining a cluster, and then allocates every data point to the nearest cluster. Typically, to process the data, the k-means algorithm starts with a first group of randomly selected centroids, which are the beginning points for every cluster, and then performs iterative calculations to optimize the positions of the centroids, and an optimized cluster is a cluster having the nearest mean. Specifically, a cluster is determined to be optimized when either there is no change in the value of the centroids as a result of a successful cluster, or a defined. number of iterations has been reached. As a result, the objective of k-means clustering is to group similar data points together and discover underlying patterns common to the data points.

FIG. 1 illustrates a computer system for implementing the method for classifying and filtering data, according to an example embodiment. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term non-transitory is to be interpreted not as an eternal characteristic of a state, but as a characteristic of a state that will last for a period of time. The term non-transitory specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term non-transitory is to be interpreted not as an eternal characteristic of a state, but as a characteristic of a state that will last for a period of time. The term non-transitory specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT) a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus, Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses, Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive, In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
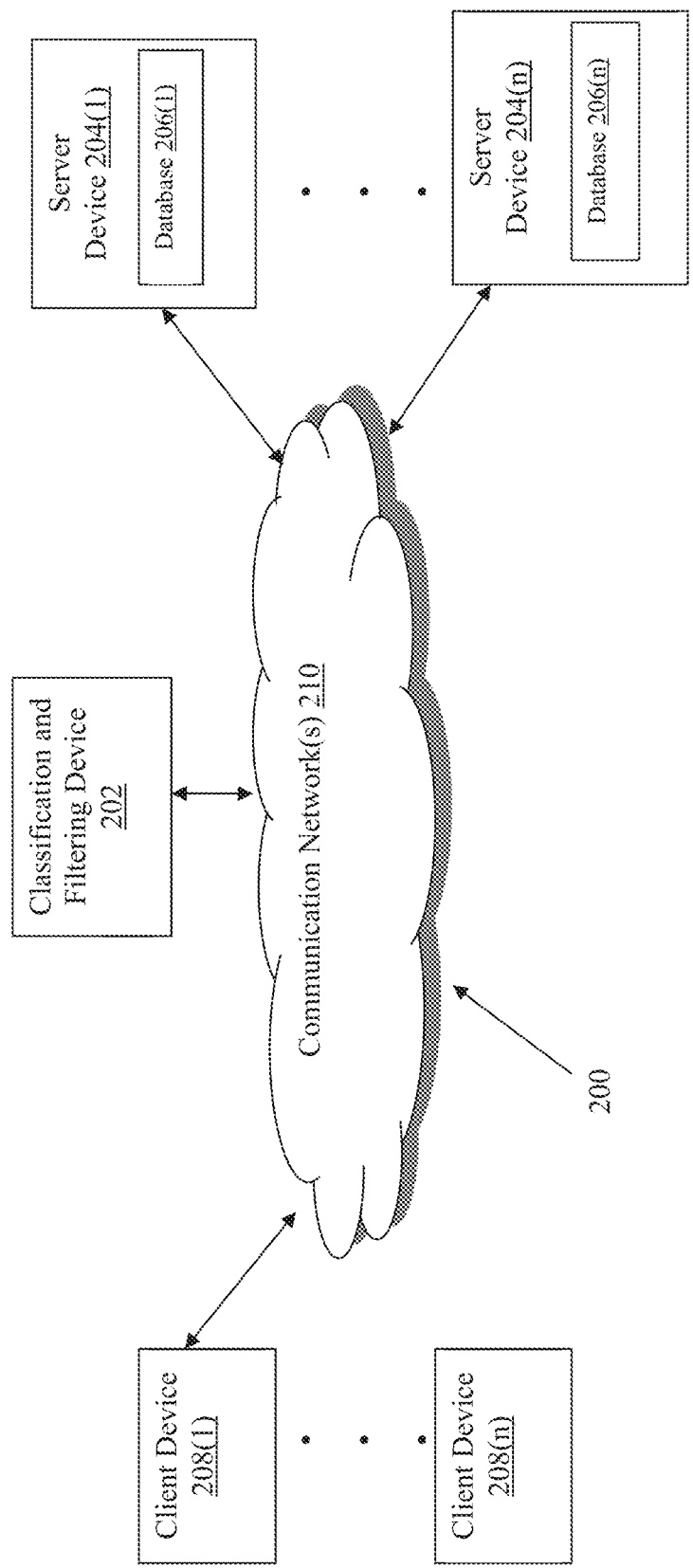
FIG. 2 illustrates a diagram of a network environment for classifying and filtering data, according to an exemplary embodiment.

Referring to FIG. 2, a schematic of an exemplary network environment 200 for implementing a data classification and filtering framework is illustrated. In an exemplary embodiment, the data classification and filtering framework is executable on any networked computer platform, such as, for example, a wireless mobile communication device, i.e., a smart phone.

The data classification and filtering device 202 may be the same or similar to the computer system 102 as described with respect to FIG. 1. The data classification and filtering device 202 may store one or more applications that can include executable instructions that, when executed by the data classification and filtering device 202, cause the data classification and filtering device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the data classification and filtering device 202 itself, may be located in virtual server(s) running in a cloud-based computing environment rather than being tied to one or more specific physical network computing devices. Also, the application(s) may be running in one or more virtual machines (VMs) executing on the data classification and filtering device 202. Additionally, in one or more embodiments of this technology, virtual machine(s) running on the data classification and filtering device 202 may be managed or supervised by a hypervisor.

In the network environment 200 of FIG. 2, the data classification and filtering device 202 is coupled to a plurality of server devices 204(1)-204(n) that hosts a plurality of databases 206(1)-206(n), and also to a plurality of client devices 208(1)-208(n) via communication network(s) 210. A communication interface of the data classification and filtering device 202, such as the network interface 114 of the computer system 102 of FIG. 1, operatively couples and communicates between the data classification and filtering device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to HG. 1, although the data classification and filtering device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and classification and filtering devices that efficiently classify and filter information in a collaborative platform using machine learning algorithms.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The data classification and filtering device 202 may be a standalone device or integrated with one or more other devices or apparatuses, such as one or more of the server devices 204(1)-204(n), for example. In one particular example, the data classification and filtering device 202 may include or be hosted by one of the server devices 204(1)-204(n), and other arrangements are also possible. Moreover, one or more of the devices of the data classification and filtering device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the data classification and filtering device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store data provided by a requester at a collaboration platform and data provided by other users of the collaboration platform.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are envisaged.

The plurality of client devices 208(1)-208(n) may also be the same or similar to the computer system 102 or the computer device 120 as described with respect to FIG. 1, including any features or combination of features described with respect thereto. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the data classification and filtering device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the data classification and filtering device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the data classification and filtering device 202, the server devices 204(1)-204(n), or the client devices 208(1)-208(n), for example, may be configured to operate as virtual instances on the same physical machine. In other words, one or more of the data classification and filtering device 202, the server devices 204(1)-204(n), or the client devices 208(1)-208(n) may operate on the same physical device rather than as separate devices communicating through communication network(s) 210. Additionally, there may be more or fewer classification and filtering devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
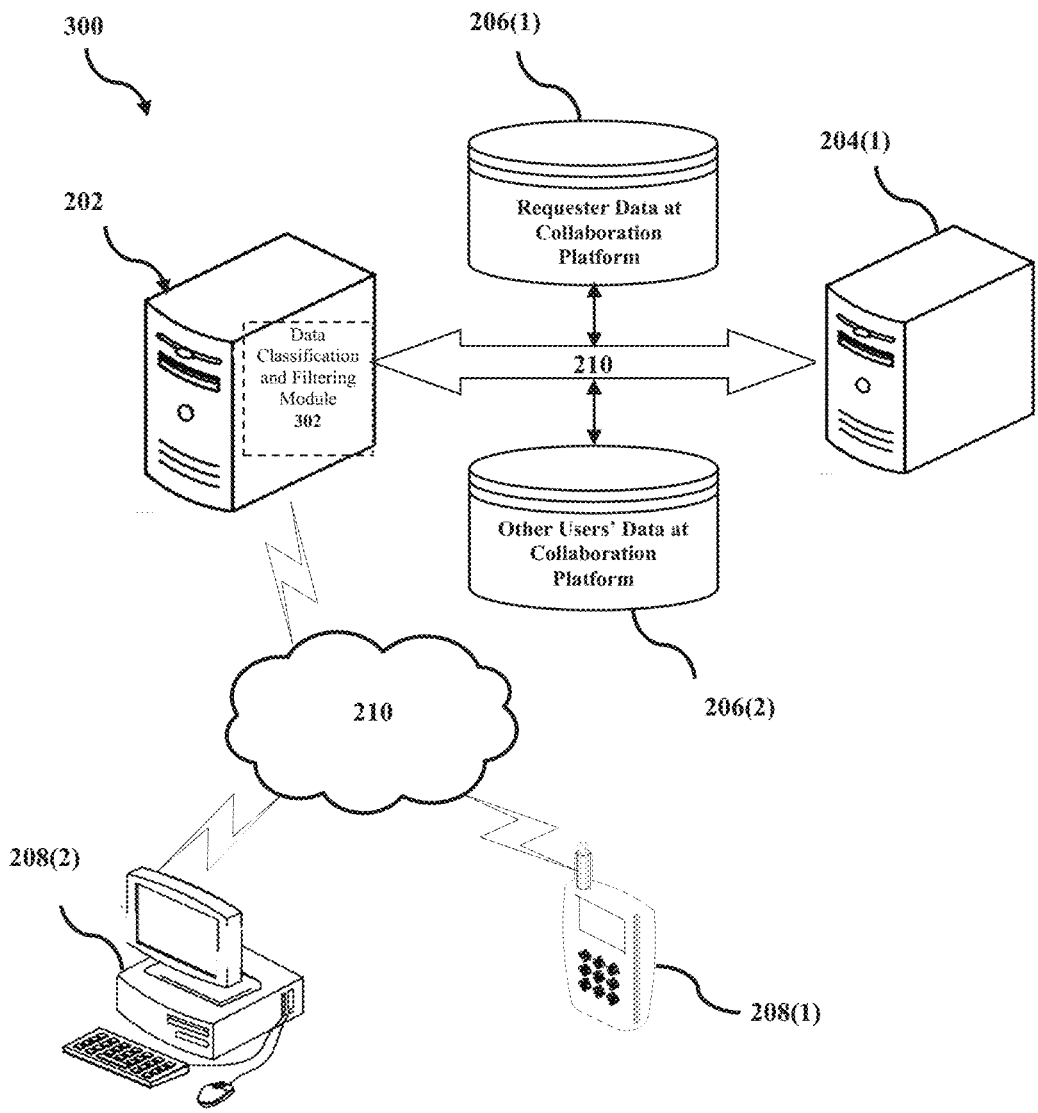
FIG. 3 shows a system for implementing a method for classifying and filtering data, according to an exemplary embodiment.

The data classification and filtering device 202 is described and shown in FIG. 3 as including a data classification and filtering module 302, although it may include other rules, policies, modules, databases, or applications, for example. As will be described below, the data classification and filtering module 302 is configured to generate relevant data in an automated, efficient, scalable, and reliable manner.

An exemplary process 300 for implementing a data classification and filtering framework for a service by utilizing the network environment of FIG. 2 is shown as being executed in FIG. 3. Specifically, a first client device 208(1) and a second client device 208(2) are illustrated as being in communication with classification and filtering device 202. In this regard, the first client device 208(1) and the second client device 208(2) may be "clients" of the data classification and filtering device 202 and are described herein as such. Nevertheless, it is to be known and understood that the first client device 208(1) and/or the second client device 208(2) need not necessarily be "clients" of the data classification and filtering device 202, or any entity described in association therewith herein. Any additional or alternative relationship may exist between either or both of the first client device 208(1) and the second client device 208(2) and the data classification and filtering device 202, or no relationship may exist.

Further, classification and filtering device 202 is illustrated as being able to access a requester data at collaboration platform database 206(1) and an other user's data at collaboration platform database 206(2). The data classification and filtering module 302 may be configured to access these databases for implementing a data classification and filtering framework for a service.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the data classification and filtering device 202 via broadband or cellular communication. Of course, these embodiments are merely exemplary and are not limiting or exhaustive.

Upon being started, the data classification and filtering module 302. executes a process for classifying and filtering data. An exemplary process for implementing a method for classifying and filtering data is generally indicated at flowchart 400 in FIG. 4, which is a flowchart of an exemplary process for classifying and filtering data, according to an exemplary embodiment.

Figure 4:
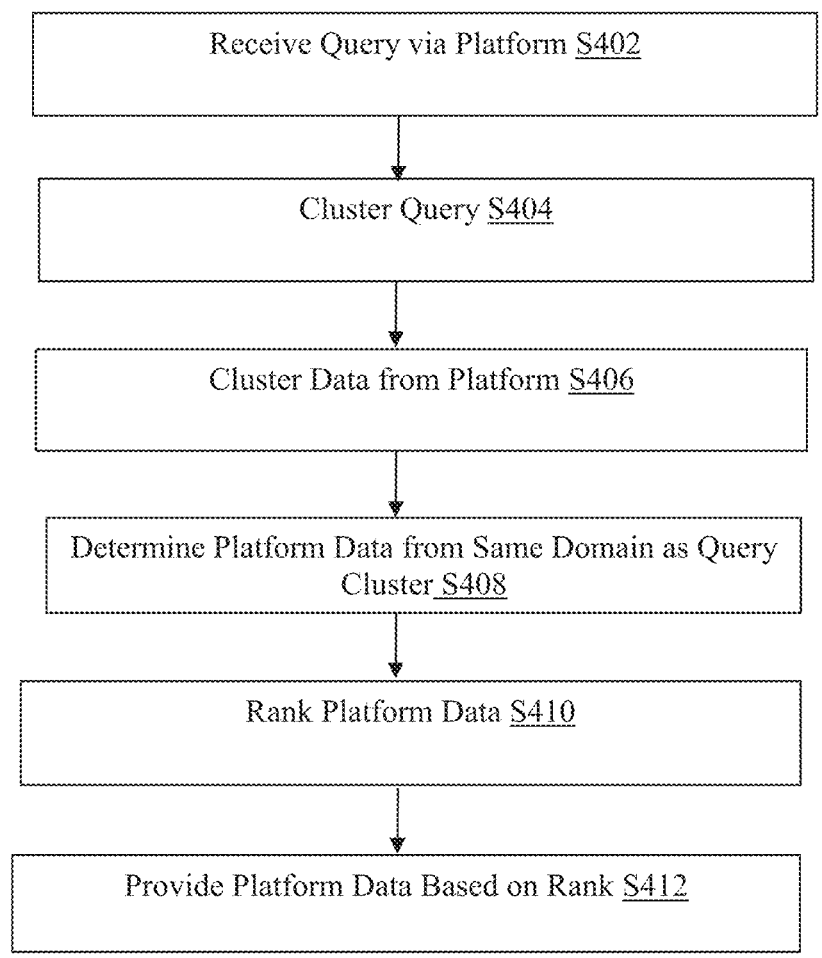
FIG. 4 is a flowchart of a process for classifying and filtering data, according to an exemplary embodiment.

In the process 400 of FIG. 4, at step S402, a query is received at a collaboration platform. In an exemplary embodiment, the query may include any one or more of a message, a question, a posting, and/or a search request. In an exemplary embodiment, the message may include any of or more of an email message, a voicemail message and/or a chat message. In an exemplary embodiment, the query is received at the collaboration platform from a user of the collaboration platform via, for example, messaging, email, voicemail, or the like. In an exemplary embodiment, the collaboration platform includes a data server, the data server including a plurality of messages and/or a plurality of documents. For example, the collaboration platform may be or include a messaging server, and the query may be a question or request initiated by the user of the collaboration platform. In an exemplary embodiment, the collaboration platform includes a number of data items, each data item being or including, for example, messages, articles, or other data sources exchanged between the various users of the collaboration platform. Accordingly, when the collaboration platform is utilized by a number of users, the memory of the collaboration platform may store a number of data items such as messages, emails, articles, and the like that have been exchanged by the users.

At step S404, the data classification and filtering module 302 performs clustering of the query to generate a query cluster. For example, the data classification and filtering module 302 may utilize a machine learning algorithm to generate the query cluster based on the query received from the user at the collaboration platform. In an exemplary embodiment, the data classification and filtering module 302 clusters the query received from the user by using machine learning algorithms. Accordingly, the data classification and filtering module 302 trains on the query received from the user to reveal the structure and meaning of the text included in the query. In an exemplary embodiment, the data classification and filtering module 302 identifies patterns in the query and is thus able to recognize features that are specific to the query received from the user, which increases the quality of the clustering. As a further example, the data classification and filtering module 302 may generate the query cluster k-means clustering. During clustering, the data classification and filtering module 302 also determines the domain to which the user query corresponds. Accordingly, at step 8404, the data classification and filtering module 302 generates a query cluster via k-means clustering based on the query provided from the user, and identifies a domain to which the cluster belongs, which is the user domain.

At step S406, according to various exemplary embodiments, the data classification and filtering module 302 clusters the various data items stored in a memory of the collaboration platform, or available at the collaboration platform, via a clustering method such as, e.g., k-means clustering. For example, the data classification and filtering module 302. clusters the data items that are exchanged at the collaboration platform, and generates one or more clusters of data items. In one or more exemplary embodiments, each cluster includes data items, such as messages, mails, articles, and the like, that have certain similarities. In an exemplary embodiment, the clustering of the data items is performed by the data classification and filtering module 302 utilizing machine learning processing, for example, k-means clustering. In an exemplary embodiment, the data classification and filtering module 302 also determines the domains to which each of the clusters, or the clustered data items, belong. Accordingly, at step S406, the data classification and filtering module 302. generates one or more clusters of data items via k-means clustering, and identifies domains to which each of the one or more clusters belong.

In an exemplary embodiment, at step S408, the data classification and filtering module 302. determines which of the one or more clusters of data items, and the clustered data items included therein, are part of the same domain as the query cluster, i.e., the user domain. Accordingly, at step S408, the data classification and filtering module 302 identifies which data cluster belongs to the same domain as the user domain.

In an exemplary embodiment, at step S410, for the data cluster that has been identified as belonging to the same domain as the query cluster, the data classification and filtering module 302 ranks each of the various data items included in that data cluster and assigns a rank to each individual data item within that same data cluster. In an exemplary embodiment, the data classification and filtering module 302 ranks each of the various data items included in the cluster by counting a number of times a given data item has been viewed by users, by counting a number of times a given data item has been shared by users, and/or via any other metric indicative of the relevance of that data item to the user query. Accordingly, for example, the larger the number of views or of shares of a data item, the higher the ranking of that data item. As a result, the data items that are most viewed, and most shared, but the users of the collaboration platform, are deemed most relevant to the user query.

At step 5412, the data classification and filtering module 302 determines or receives a threshold rank. For example, the threshold rank may be inputted to the data classification and filtering module 302 by a user or by an administrator of the collaboration platform. In an exemplary embodiment, the data classification and filtering module 302 identities which data items within the data cluster at is part of the same domain as the query cluster has a rank that is greater than the threshold rank. If the rank of a given data item is greater than the threshold rank, then that data item is identified as being sufficiently relevant. In an exemplary embodiment, data items identified as sufficiently relevant are routed to the user that initiated the query in the form of any one or more of a message, an email, a display, and the like. In an exemplary embodiment, the user may select, upon registration, a delivery frequency of messages from the collaboration platform. For example, the user may elect to receive messages daily, hourly, weekly, and the like.

As a result, the exemplary method discussed herein routes the most relevant data, which is a subset of the entire amount of data available on a collaboration platform, to a user based on the user submitting a query to the collaboration platform.

Figure 5:
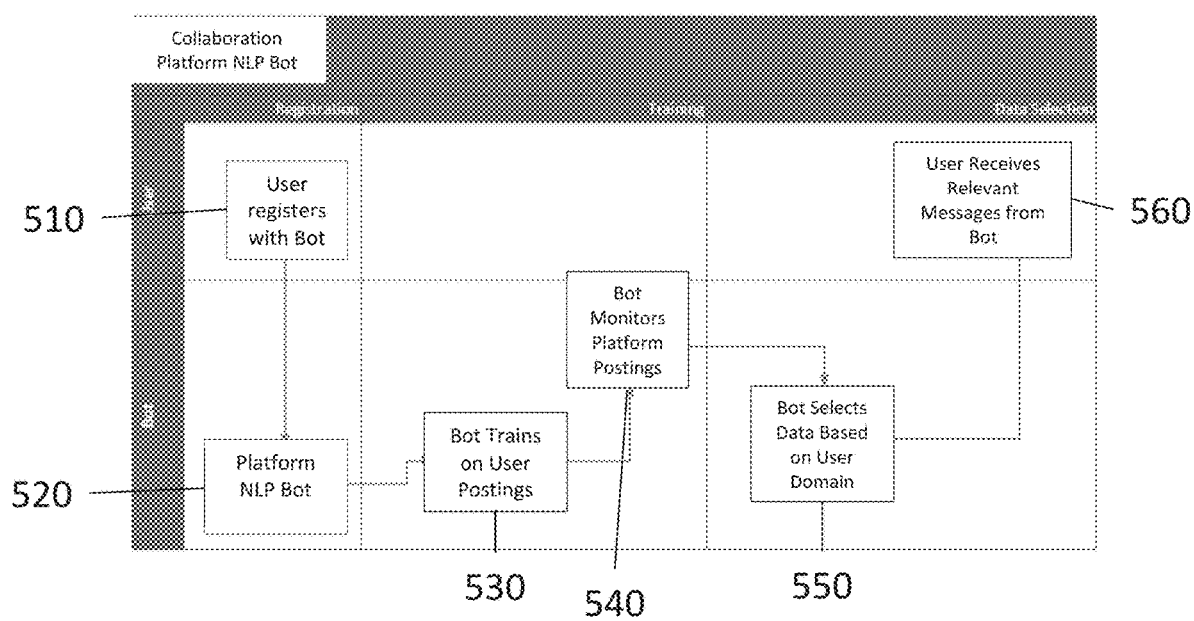
FIG. 5 illustrates a process flow for classifying and filtering data, according to an exemplary embodiment.

FIG. 5 illustrates a process flow 500 for classifying and filtering data, according to various exemplary embodiments. In FIG. 5, the user of a collaboration platform, e.g., an online collaboration platform used by a number of users, can register with the collaboration platform at 510 by providing user information to the collaboration platform. in the example illustrated in FIG. 5, the collaboration platform is the Symphony™ collaboration platform, but other types of collaboration platforms may be used. In an exemplary embodiment, the user may select, upon registration, a delivery frequency of messages from the collaboration platform. For example, the user may elect to receive messages daily, hourly, weekly, and the like.

In an exemplary embodiment, at 520, the user information provided by the user during registration is received by a program at the collaboration platform, herein referred to as a "Bot." In an exemplary embodiment, at 530, the Bot receives messages, queries and/or postings entered by the user, and clusters those messages, queries and/or postings. For example, the Bot may cluster the user's messages, queries and/or postings via natural language processing analysis by using machine learning algorithms, and more specifically k-means clustering. Accordingly, the Bot trains on the queries and/or postings entered by the user to reveal the structure and meaning of the text included in the queries and/or postings. Specifically, the Bot identifies patterns in the queries and/or postings entered by the user and is thus able to recognize features specific to the queries and/or postings entered by the user, which increases the quality of the clustering. In an exemplary embodiment, if the user's messages, queries and/or postings are related to different domains, then each of the user's messages, queries and/or postings may be clustered individually under a different user domain. In an exemplary embodiment, the Bot also identifies the domain to which the user query belongs.

Contemporaneously, in an exemplary embodiment, at 540, the Bot clusters the messages and postings submitted by other users of the collaboration platform, for example by all the other users of the collaboration platform. In an exemplary embodiment, the Bot clusters the messages and postings submitted by the other users using k-means clustering. For example, the Bot may access the messages and postings of the other users via an application programming interface (API) such as, for example, the Firehose API, which is a steady stream of all available data provided from all the users of the collaboration platform in real time. In an exemplary embodiment, the data stream is substantially constant, delivering new and updated data as the data is provided by the users of the collaboration platform. Accordingly, the Bot clusters subsets of the data stream submitted by the other users using k-means clustering to generate clusters of data items, each cluster including data items having certain similarities. In an exemplary embodiment, the Bot indexes the data items to facilitate searching and retrieval of the data items at the collaboration platform by a user.

In an exemplary embodiment, at 550, the Bot classifies clusters of data items that share certain similarities by domain. For example, the domains may be Trading, Market Data, Human Resources, Cloud Technology, Commercial Bank, and the like, and each of these domains may include a cluster of data items, the data items having similarities identifying them as belonging to the particular domain.

In an exemplary embodiment, at 560, the Bot identifies a cluster of data items from the collaboration platform as being in the same domain as the user domain, and ranks the clustered data items, such as messages or postings provided by the users of the collaboration platform, within the cluster that is in the same domain as the user domain, in order of relevance. In an exemplary embodiment, relevance is established, e.g., by the number of views that a given message or posting has received from the users of the collaboration platform, or a number of times that message has been shared by the users of the collaboration platform. Accordingly, the ranking of each message or posting within a cluster is established based on the relevance of that message to the user query. In an exemplary embodiment, the Bot compares the ranking of each of the data items to a threshold, and only routes the data items having a rank that is greater than the threshold rank to the user who initiated the query. Accordingly, the Bot provides the clustered data items that have the greatest relevance to the user who initiated the query.

Figure 6:
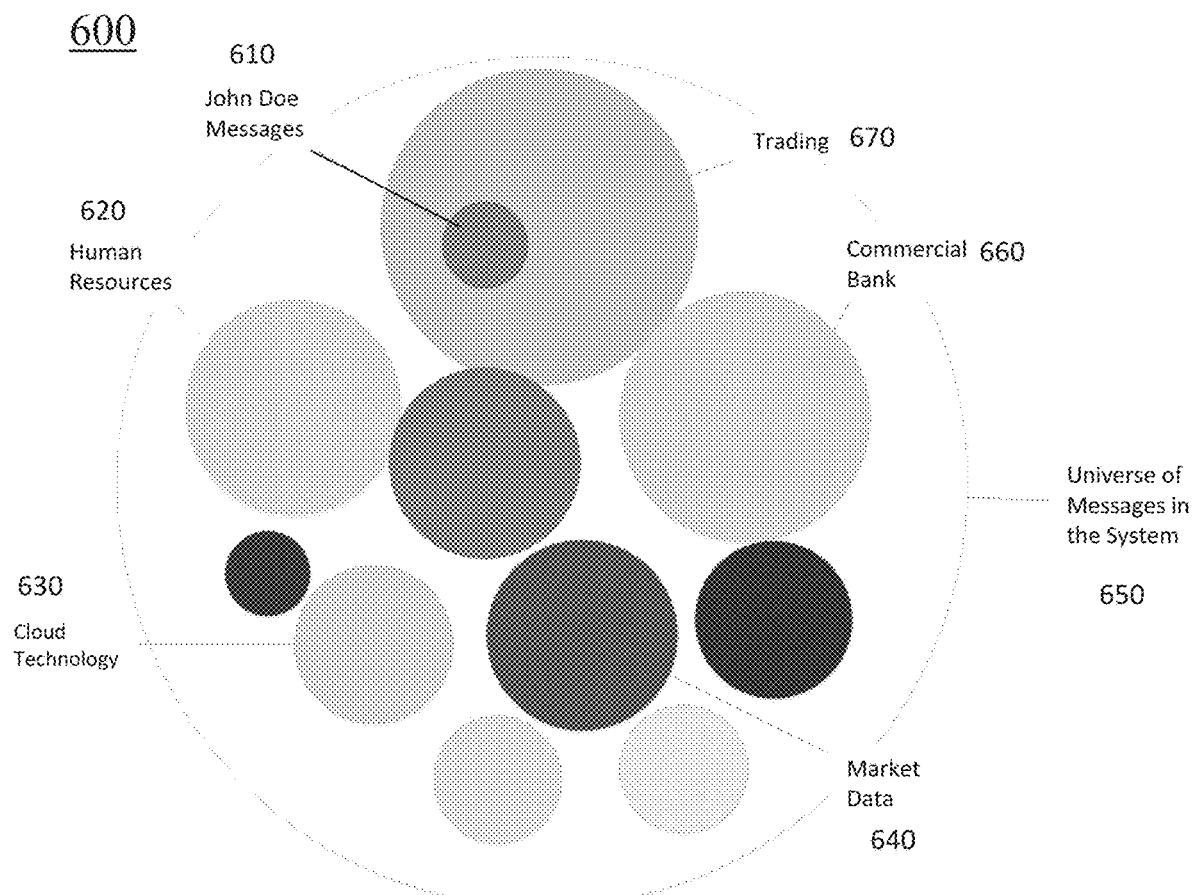
FIG. 6 illustrates a diagram illustrating a system for classifying and filtering data, according to an exemplary embodiment.

FIG. 6 is a diagram 600 illustrating a system for classifying and filtering data, according to an exemplary embodiment. The diagram 600 encompasses the universe 650 of messages or postings available at the collaboration platform. In embodiments, the universe 650 includes a plurality of domains such as, e.g., Human Resources 620, Cloud Technology 630, Market Data 640, Commercial Bank 660, and Trading 670. For example, if a given user ("John Doe") sends one or more messages 610 to the collaboration platform, and these messages 610 are related to Trading, the Bot determines that the user messages 610 are part of the Trading domain 670, and places the user messages 610 under the Trading domain 670. The Bot may also index the user messages 610 within the Trading domain 670 to facilitate later retrieval. Accordingly, FIG. 6 provides a visual representation of the manner in which messages are clustered, indexed and classified in the collaboration platform, according to an exemplary embodiment.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular processes, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media, in a particular non-limiting, exemplary embodiment, the computer-readable medium can include a solid-state memory such as a memory card or other package that houses one or more non-volatile read-only memories. Further, the computer-readable medium can be a random-access memory (RAM) or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in example embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of the entirety of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for classifying and filtering data, the method being implemented by a processor on a computing device, the method comprising:
    receiving, by the processor, a query via a platform, the platform including platform data;
    clustering, by the processor, the query to create a query cluster;
    identifying, by the processor, a domain of the query cluster;
    clustering, by the processor, the platform data to create at least one platform data cluster;
    identifying, by the processor, a corresponding platform data cluster, the corresponding platform data cluster being one from among the at least one platform data cluster that is in a same domain as the domain of the query cluster;
    assigning a rank, by the processor, to at least one portion of the platform data within the corresponding platform data cluster; and
    routing, by the processor, at least one from among the at least one portion of the platform data for which the assigned rank is greater than a predetermined threshold,
    wherein the assigning of the rank is performed based on at least one from among a number of times the at least one portion of the platform data is shared between users and a number of times the at least one portion of the platform data has been viewed by the users, and
    wherein at least one from among the clustering of the query and the clustering of the platform data comprises using a machine learning algorithm.

2. The method of claim 1, wherein the routing comprises transmitting the at least one portion of the platform data to an initiator of the query.

3. The method of claim 1, wherein the query comprises at least one from among a message, a question, and a search request.

4. The method of claim 3, wherein the message comprises at least one from among an email message, a voicemail message, and a chat message.

5. The method of claim 1, wherein the using the machine learning algorithm comprises using a k-means clustering algorithm.

6. The method of claim 1, wherein the platform comprises a data server that is configured to facilitate access to at least one from among a plurality of messages and a plurality of documents.

7. The method of claim 1, wherein the platform comprises at least one from among a collaboration platform, a chat platform and a messaging platform.

8. The method of claim 1, further comprising repeating each of the receiving the query, the clustering the query, the identifying the domain, the clustering the platform data, the identifying the corresponding platform data cluster, the assigning the rank, and the routing at a user-selectable periodic interval.

9. A computing apparatus for classifying and filtering data, the computing apparatus comprising:
a processor;
a memory; and
a communication interface coupled to each of the processor and the memory,
wherein the processor is configured to:
receive, via the communication interface, a query via a platform, the platform including platform data;
cluster the query to create a query cluster;
identify a domain of the query cluster;
cluster the platform data to create at least one platform data cluster;
identify a corresponding platform data cluster, the corresponding platform data cluster being one from among the at least one platform data cluster that is in a same domain as the domain of the query cluster;
assign a rank to at least one portion of the platform data within the corresponding platform data cluster; and
route at least one of the at least one portion of the platform data for which the assigned rank is greater than a predetermined threshold,
wherein the processor is further configured to assign the rank based on at least one from among a number of times the at least one portion of the platform data is shared between users and a number of times the at least one portion of the platform data has been viewed by the users, and
wherein the processor is further configured to use a machine learning algorithm for performing at least one from among the clustering of the query and the clustering of the platform data.

10. The computing apparatus of claim 9, wherein the processor is further configured to perform the routing by transmitting, via the communication interface, the at least one portion of the platform data to an initiator of the query.

11. The computing apparatus of claim 9, wherein the query comprises at least one from among a message, a question, and a search request.

12. The computing apparatus of claim 11, wherein the message comprises at least one from among an email message, a voicemail message, and a chat message.

13. The computing apparatus of claim 11, wherein the machine learning algorithm comprises a k-means clustering algorithm.

14. The computing apparatus of claim 9, wherein the platform comprises a data server that is configured to facilitate access to at least one from among a plurality of messages and a plurality of documents.

15. The computing apparatus of claim 9, wherein the platform comprises at least one from among a collaboration platform, a chat platform and a messaging platform.

16. The computing apparatus of claim 9, wherein the processor is further configured to repeat each of the receiving the query, the clustering the query, the identifying the domain, the clustering the platform data, the identifying the corresponding platform data cluster, the assigning the rank, and the routing at a user-selectable periodic interval.

* * * * *